United States Patent
Luo et al.

(10) Patent No.: US 11,323,197 B2
(45) Date of Patent: May 3, 2022

(54) USER EQUIPMENT, BASE STATION, AND RELATED METHODS

(71) Applicants: SHARP KABUSHIKI KAISHA, Sakai (JP); FG INNOVATION COMPANY LIMITED, Tuen Mun (HK)

(72) Inventors: Chao Luo, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 160 days.

(21) Appl. No.: 16/638,003

(22) PCT Filed: Aug. 9, 2018

(86) PCT No.: PCT/CN2018/099572
§ 371 (c)(1),
(2) Date: Feb. 10, 2020

(87) PCT Pub. No.: WO2019/029607
PCT Pub. Date: Feb. 14, 2019

(65) Prior Publication Data
US 2020/0244384 A1    Jul. 30, 2020

(30) Foreign Application Priority Data
Aug. 11, 2017    (CN) .......................... 201710690015.9

(51) Int. Cl.
*H04J 11/00*    (2006.01)
*H04L 5/22*    (2006.01)
(Continued)

(52) U.S. Cl.
CPC ........ *H04J 11/0069* (2013.01); *H04L 5/0053* (2013.01); *H04L 5/14* (2013.01);
(Continued)

(58) Field of Classification Search
CPC . H04L 5/0053; H04L 5/14; H04L 5/22; H04L 27/2673; H04W 48/16;
(Continued)

(56) References Cited

U.S. PATENT DOCUMENTS

2020/0177337 A1*    6/2020    Li .......................... H04L 5/0053
2020/0178190 A1*    6/2020    Chen ....................... H04W 4/80

FOREIGN PATENT DOCUMENTS

EP            3644530 A1      4/2020
WO      2017/136003 A1      8/2017

OTHER PUBLICATIONS

Douglas Troha, Wireless system design (NB-IoT downlink simulator), Feb. 2017, pp. 1-77 (Year: 2017).*

(Continued)

*Primary Examiner* — Habte Mered
*Assistant Examiner* — Prince A Mensah
(74) *Attorney, Agent, or Firm* — ScienBiziP, P.C.

(57) ABSTRACT

The present disclosure provides a resource mapping and transmission method and a corresponding base station and user equipment. The method comprises: generating radio frames for NB-IoT TDD, and in the radio frames for NB-IoT TDD, mapping a Narrowband Primary Synchronization Signal "NPSS," a Narrowband Secondary Synchronization Signal "NSSS," a Narrowband Physical Broadcast Channel "NPBCH," and a Narrowband System Information Block Type 1 "SIB1-NB" to subframes selected from subframes 0, 4, 5, and 9 of the radio frames, wherein the NPSS, the NSSS, the NPBCH, and the SIB1-NB are respectively mapped into different subframes and are not respectively mapped into the subframes 5, 9, 0, and 4; and transmitting the generated radio frames. According to embodiments of the present invention, user equipment supporting NB-IoT TDD can exit a search for an NB-IoT TDD cell as early as possible.

4 Claims, 12 Drawing Sheets

(51) Int. Cl.
  H04L 5/00    (2006.01)
  H04L 5/14    (2006.01)
  H04L 27/26   (2006.01)
  H04W 48/16   (2009.01)
  H04W 56/00   (2009.01)
  H04W 72/04   (2009.01)

(52) U.S. Cl.
  CPC ............ H04L 5/22 (2013.01); H04L 27/2673 (2013.01); H04W 48/16 (2013.01); H04W 56/001 (2013.01); H04W 72/0446 (2013.01)

(58) Field of Classification Search
  CPC ............ H04W 56/001; H04W 72/0446; H04J 11/0069–0093
  See application file for complete search history.

(56) References Cited

OTHER PUBLICATIONS

Rubbens Boisguene, A Survey on NB-IoT Downlink Scheduling: Issues and Potential Solutions, Jun. 2017, IEEE, pp. 549-551 (Year: 2017).*

3GPP TS 36.211 V14.1.0 (Dec. 2016), 3rd Generation Partnership Project; Technical Specification Group Radio Access Network; Evolved Universal Terrestrial Radio Access (E-UTRA); Physical channels and modulation (Release 14); pp. 140-175.

Huawei et al., "On cell search and system acquisition time improvements", R1-1707027, 3GPP TSG RAN WG1 Meeting #89, Hangzhou, China, May 15-19, 2017.

Huawei, Hisilicon, Neul: "New WID on Further NB-IoT enhancements", RP-170852, #3GPP TSG RAN Meeting #75, Dubrovnik, Croatia, Mar. 6-9, 2017.

* cited by examiner

USER EQUIPMENT, BASE STATION, AND RELATED METHODS

TECHNICAL FIELD

The present disclosure relates to the technical field of wireless communications. More specifically, the present disclosure relates to user equipment (UE), a base station, and related methods.

BACKGROUND

NarrowBand Internet of Things (NB-IoT) is a wireless communication technology specification introduced by the 3rd Generation Partnership Project (3GPP) in the Rel-13 version to meet the growing demand for Machine-type communications. Compared with conventional cellular communication systems, NB-IoT is characterized in improved indoor coverage and support for a large number of low-speed connections, ultra-low device costs, ultra-low device power consumption, and low device delay sensitivity. Both the uplink and downlink bandwidths of an NB-IoT system only need 180 kHz, which is the same as the bandwidth of one physical resource block (PRB) in an LTE system. NB-IoT supports three different modes of operation: (1), standalone mode, for example, using one carrier in a GSM system; (2) guard-band mode, for example, using 180 kHz spectrum in a guard band in an LTE carrier; and (3), in-band mode, for example, using one PRB in an LTE carrier. However, the NB-IoT in the Rel-13 version only supports Frequency-Division Duplex (FDD) and does not support Time-Division Duplex (TDD).

At the 3GPP RAN #75 meeting held in March 2017 new work on further NB-IoT enhancements (see RP-170852: New WID on Further NB-IoT enhancements) was proposed. One of the objectives of this research project on the Rel-15 version is to add support for TDD. The baseline objective is to use the same set of mechanisms to support in-band, guard-band, and standalone modes of operation under TDD.

After the introduction of TDD, one problem that the NB-IoT system needs to solve is how UE distinguishes whether a cell is configured in FDD mode or TDD mode during cell search. Solving this problem is important at least for UEs prior to Rel-15; since these UE do not support TDD, during the process of accessing a TDD cell, these UE need to identify that the cell cannot be camped on so as to switch to other cells. Particularly, since a cell search and system information reading process of NB-IoT UE in deep coverage may last several seconds, when such UE attempts to access an NB-IoT TDD cell, the system should cause these UE to encounter an error as soon as possible, thus exiting the cell search and/or system information reading, otherwise the power consumption and system access latency of these UE will be greatly affected.

Therefore, a mechanism for distinguishing between FDD and TDD modes is desired.

SUMMARY

The present disclosure provides a resource mapping scheme suitable for NB-IoT TDD cells, which can facilitate user equipment to distinguish whether a cell is configured in FDD mode or TDD mode during cell search.

According to a first aspect of the present disclosure, provided is a method executed at a base station of a cell supporting NarrowBand Internet of Things (NB-IoT) Time-Division Duplex (TDD), comprising: generating radio frames for NB-IoT TDD, and in the radio frames for NB-IoT TDD, mapping a Narrowband Primary Synchronization Signal "NPSS," a Narrowband Secondary Synchronization Signal "NSSS," a Narrowband Physical Broadcast Channel "NPBCH," and a Narrowband System Information Block Type 1 "SIB1-NB" to subframes selected from subframes 0, 4, 5, and 9 of the radio frames, wherein the NPSS, the NSSS, the NPBCH, and the SIB1-NB are respectively mapped into different subframes and are not respectively mapped into the subframes 5, 9, 0, and 4; and transmitting the generated radio frame.

According to a second aspect of the present disclosure, provided is a base station of a cell supporting NarrowBand Internet of Things (NB-IoT) Time-Division Duplex (TDD) for executing, the method described above. The base station comprises: a processing unit, configured to generate radio frames for NB-IoT TDD, and in the radio frames for NB-IoT TDD, mapping a Narrowband Primary Synchronization Signal "NPSS," a Narrowband Secondary Synchronization Signal "NSSS," a Narrowband Physical Broadcast Channel "NPBCH," and a Narrowband System Information Block Type 1 "SIB1-NB" to subframes selected from subframes 0, 4, 5, and 9 of the radio frames, wherein the NPSS, the NSSS, the NPBCH, and the SIB1-NB are respectively mapped into different subframes and are not respectively mapped into the subframes 5, 9, 0, and 4; and a transmitter configured to transmit the generated radio frames.

In some embodiments, the NPSS, the NSSS, the NPBCH, and the SIB1-NB are mapped into the subframes 0, 9, 5, and 4, respectively.

Alternatively, in some other embodiments, the NPSS, the NSSS, the NPBCH, and the SIB1-NB are mapped into the subframes 9, 5, 0, and 4, respectively.

Alternatively, in some other embodiments, the NPSS, the NSSS, the NPBCH, and the SIB1-NB are mapped into the subframes 4, 9, 0, and 5, respectively.

Alternatively, in some other embodiments, the NPSS, the NSSS, the NPBCH, and the SIB1-NB are mapped into the subframes 5, 0, 9, and 4, respectively.

Alternatively, in some other embodiments, the NPSS, the NSSS, the NPBCH, and the SIB1-NB are mapped into the subframes 5, 4, 0, and 9, respectively.

Alternatively, in some other embodiments, the NPSS, the NSSS, the NPBCH, and the SIB1-NB are mapped into the subframes 5, 9, 4, and 0, respectively.

According to a third aspect of the present disclosure, provided is a method executed at user equipment supporting NarrowBand Internet of Things (NB-IoT) Time-Division Duplex (TDD), comprising: receiving radio signals on a detected cell; detecting a Narrowband Primary Synchronization Signal (NPSS) and a Narrowband Secondary Synchronization Signal (NSSS) from the received radio signals according to a mapping scheme in which it is assumed that the "NPSS," the "NSSS," a Narrowband Physical Broadcast Channel "NPBCH," and a Narrowband System Information Block Type 1 "SIB1-NB" are mapped into subframes selected from subframes 0, 4, 5, and 9 in the radio frames, wherein the NPSS, the NSSS, the NPBCH, and the SIB1-NB are respectively mapped into different subframes and are not respectively mapped into the subframes 5, 9, 0, and 4; and determining, according to the detection result, whether the radio frames are radio frames for an NB-IoT TDD cell.

According to a fourth aspect of the present disclosure, provided is user equipment supporting NarrowBand Internet of Things (NB-IoT) Time-Division Duplex (TDD) for executing the method described above, comprising: a receiver, configured to receive radio signals on a detected cell; and a processing unit, configured to detect a Narrow-Band Primary Synchronization Signal (NPSS) and a Narrowband Secondary Synchronization Signal (NSSS) from the received radio signals according to a mapping scheme in which it is assumed that the "NPSS," the "NSSS," a Narrowband Physical Broadcast Channel "NPBCH," and a Narrowband System Information Block Type 1 "SIB1-NB" are mapped into subframes selected from subframes 0, 4, 5, and 9 in the radio frames, wherein the NPSS, the NSSS, the NPBCH, and the SIB1-NB are respectively mapped into different subframes and are not respectively mapped into the subframes 5, 9, 0, and 4; and determine, according to the detection result, whether the radio frames are radio frames for an NB-IoT TDD cell.

According to some embodiments, the mapping scheme is: mapping the NPSS, the NSSS, the NPBCH, and the SIB1-NB into the subframes 0, 9, 5, and 4, respectively.

Alternatively, according to some other embodiments, the mapping scheme is: mapping the NPSS, the NSSS, the NPBCH, and the SIB1-NB into the subframes 9, 5, 0, and 4, respectively.

Alternatively, according to some other embodiments, the mapping scheme is: mapping the NPSS, the NSSS, the NPBCH, and the SIB1-NB into the subframes 4, 9, 0, and 5, respectively.

Alternatively, according to some other embodiments, the mapping scheme is: mapping the NPSS, the NSSS, the NPBCH, and the SIB1-NB into the subframes 5, 0, 9, and 4, respectively.

Alternatively, according to some other embodiments, the mapping scheme is: mapping the NPSS, the NSSS, the NPBCH, and the SIB1-NB into the subframes 5, 4, 0, and 9, respectively.

Alternatively, according to some other embodiments, the mapping scheme is: mapping the NPSS, the NSSS, the NPBCH, and the SIB1-NB into the subframes 5, 9, 4, and 0, respectively. In these embodiments, the method described above further comprises: receiving, from the received radio signals according to the mapping scheme, an MIB-NB carried by the NPBCH, and the SIB1-NB; and determining whether the radio frames are radio frames for an NB-IoT TDD cell according to the detection result of the NPSS and the NSSS and the reception result of the MIB-NB and/or the SIB1-NB.

DESCRIPTION OF THE DRAWINGS

The above and other features of the present disclosure become more apparent with the following detailed description in conjunction with the accompanying drawings.

In the accompanying drawings, similar reference numerals indicate same or similar elements.

DETAILED DESCRIPTION

Figure 1:
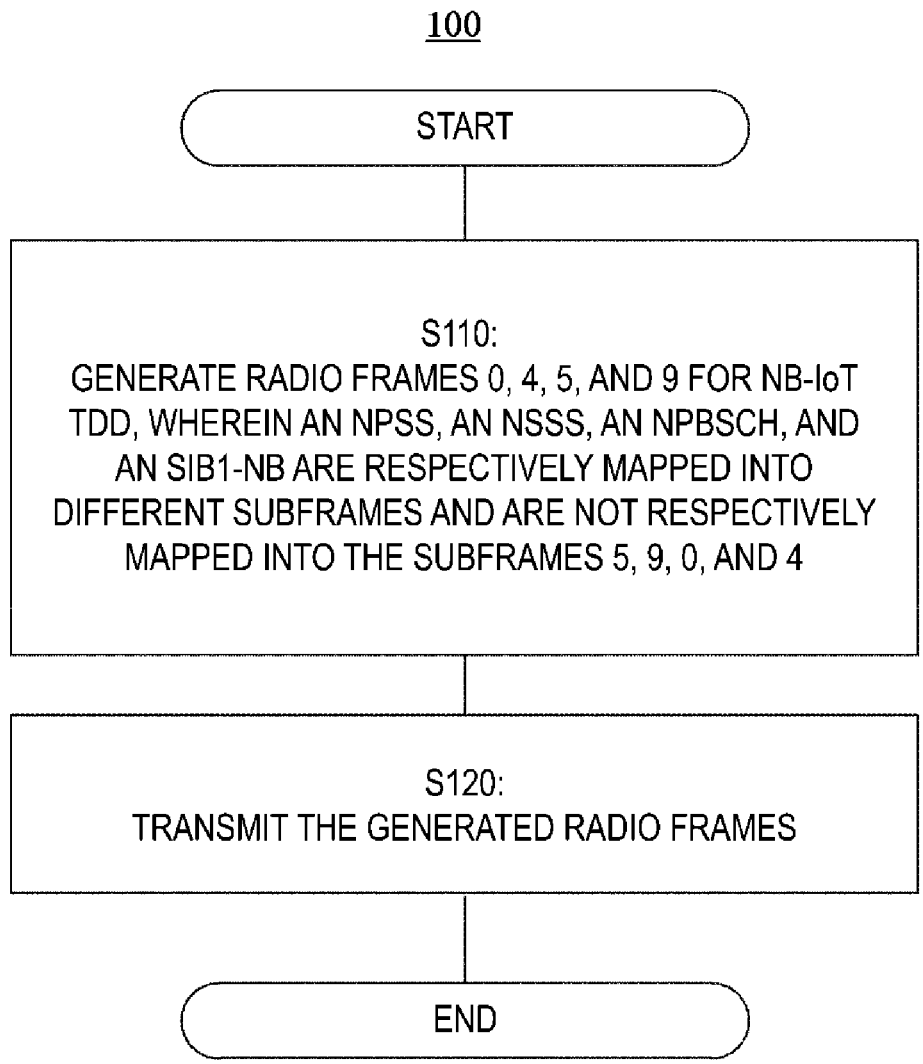
FIG. 1 is a flowchart of a method executed at a base station supporting NB-IoT TDD mode according to an embodiment of the present disclosure.

The following describes the present application in detail with reference to the accompanying drawings and specific embodiments. It should be noted that the present application should not be limited to the specific embodiments described below. In addition, for simplicity, detailed description of the known art not directly related to the present application is omitted to prevent confusion in understanding the present application.

The base station of the present invention is an entity for communicating with user equipment, and may also refer to a Node B or an evolved Node B (eNB) or an access point (AP).

The user equipment in the present invention may also refer to a terminal or an access terminal or a station or a mobile station or the like. The user equipment may be a cellular phone or a personal digital assistant (PDA) or a cordless telephone or a notebook computer or a mobile phone or a smart phone or a handheld device or a netbook or the like.

As previously mentioned, the Rel-13 version of NB-IoT only supports Frequency Division Duplex (FDD) and does not support Time Division Duplex (TDD). In existing standards, an NB-IoT FDD cell transmits the following signal/channel/system information blocks in downlink radio frames (see 3GPP TS 36.211 for details):

1. A Narrowband Primary Synchronization Signal (NPSS), transmitted in subframe 5 of each radio frame;

2. A Narrowband Secondary Synchronization Signal (NSSS), transmitted in subframe 9 of even-numbered radio frames;

3. A Narrowband Physical Broadcast Channel (NPBCH), which occupies subframe 0 of each radio frame. The NPBCH carries a Narrowband Master Information Block (MasterInformationBlock-NB, MIB-NB) with a scheduling period of 640 milliseconds. Thus, the MIB-NB is continuously transmitted for 64 radio frames starting from a radio frame whose frame number is an integer multiple of 64.

4. A Narrowband System Information Block Type 1 (SystemInformationBlockType1-NB, SIB1-NB), which occupies subframes 4 of a portion of radio frames. The starting radio frame of the SIB1-NB depends on a Physical Cell Identity (PCID), which occupies subframes 4 of every other radio frame in 16 consecutive radio frames without repetition, 8 radio frames in total. Transmission of the SIB1-NB may be repeated 4, 8, or 16 times over a period of 256 radio frames (depending on system configuration).

In order for NB-IoT UE not supporting TDD to identify as soon as possible that a TDD cell cannot be camped on so as to avoid unnecessary system access latency and power consumption, the present invention provides a resource mapping scheme for an NB-IoT TDD cell. Similar to an NB-IoT FDD cell, the NB-IoT TDD cell also transmits the NPSS, the NSSS, the NPBCH, and the SIB1-NB in downlink radio frames. However, resource mapping of the above four signal/channel/system information blocks in the TDD cell will change compared to resource mapping in the NB-IoT FDD cell. Preferably, subframes into which two of the four signal/channel/system information blocks described above will exchange, and the remaining two signal/channel/system information blocks may remain unchanged or may be exchanged.

Embodiments of the present disclosure are described below with reference to the accompanying drawings.

FIG. 1 is a flowchart of a method 100 executed at a base station supporting an NB-IoT TDD mode according to an embodiment of the present disclosure. As shown in the figure, the method 100 includes the following steps.

As shown in the figure, in step S110, the base station generates radio frames for NB-IoT TDD. In the radio frames for NB-IoT TDD, an NPSS, an NSSS, an NPBCH, and an SIB1-NB are mapped into subframes selected from subframes 0, 4, 5, and 9 of the radio frames, where the NPSS, the NSSS, the NPBCH, and the SIB1-NB are respectively mapped into different subframes and are not respectively mapped into the subframes 5, 9, 0, and 4, (i.e., different from a mapping scheme of the four signal/channel/system information blocks in FDD).

In step S120, the base station transmits the generated radio frames in a cell thereof.

The mapping scheme of the NPSS, the NSSS, the NPBCH, and the SIB1-NB in step S110 is described below in detail with reference to FIGS. 2-7. It should be understood that the illustrated mapping scheme is merely illustrative rather than as a limitation.

As previously mentioned, in radio frames for NB-IoT FDD in the existing standards, an NPSS, an NSSS, an NPBCH, and an SIB1-NB are respectively mapped into subframes 5, 9, 0, and 4.

In the embodiments of the present invention, resource mapping of the NPSS, the NSSS, the NPBCH, and the SIB1-NB in radio frames for NB-IoT TDD is distinguished from the resource mapping in the radio frames for NB-IoT FDD, that is, they are not respectively mapped into subframes 5, 9, 0, and 4.

Figure 2:
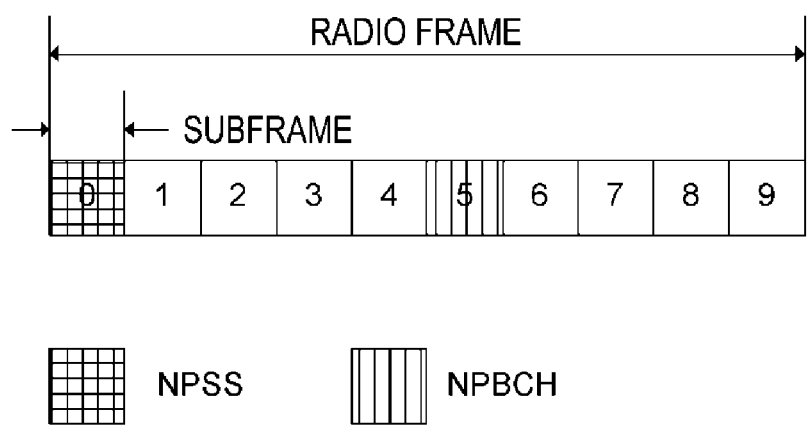
FIG. 2 is a schematic diagram of a resource mapping scheme according to a first embodiment.

In a first embodiment, as shown in FIG. 2, in the radio frames for NB-IoT TDD, the NPSS and the NPBCH may be respectively mapped into subframes 0 and 5. Specifically, the sequence of the NPSS is mapped into subframe 0 in each radio frame, and complex-valued symbols on the NPBCH are transmitted over subframes 5 in 64 consecutive radio frames. In this embodiment, the resource mapping of the NPSS and the NPBCH in the radio frames for NB-IoT TDD is exchanged compared to the resource mapping in the radio frames for NB-IoT FDD. In this case, user equipment not supporting NB-IoT TDD will encounter an error during detection of the NPSS and the NSSS when performing a cell search (because the resource mapping of the NPSS and the NSSS in the radio frames for NB-IoT TDD is not the same as the resource mapping in the radio frames for NB-IoT FDD), and thereby exit the cell search as early as possible. In addition, the resource mapping of the other two signal/system information block NSSS and SIB1-NB in the radio frames for NB-IoT TDD may be the same as the resource mapping in the radio frames for NB-IoT FDD (i.e., they are respectively mapped into the subframes 9 and 4), or may be exchanged.

Figure 3:
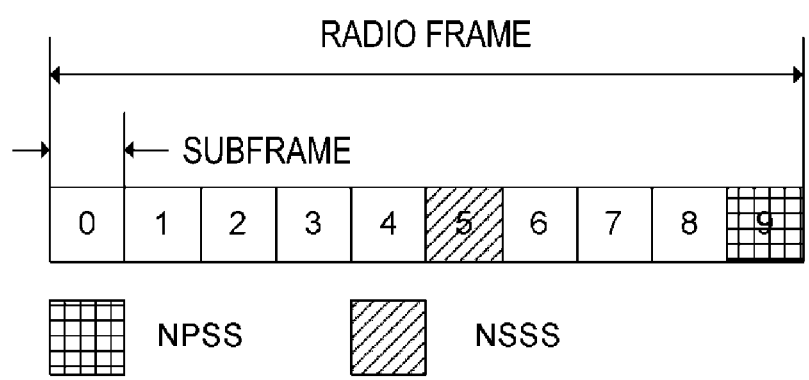
FIG. 3 is a schematic diagram of a resource mapping scheme according to a second embodiment.

In a second embodiment, as shown FIG. 3, in the radio frames for NB-IoT TDD, the NPSS and the NSSS may be respectively mapped into the subframes 9 and 5. Specifically, the sequence of the NPSS is mapped into subframe 9 of each radio frame, and the sequence of the NSSS is mapped into subframes 5 of even-numbered radio frames. In this embodiment, the resource mapping of the NPSS and the NSSS in the radio frames for NB-IoT TDD is exchanged compared to the resource mapping in the radio frames for NB-IoT FDD. In this case, user equipment not supporting NB-IoT TDD will encounter an error during detection of the NPSS and the NSSS when performing a cell search (because the resource mapping of the NPSS and the NSSS in the radio frames for NB-IoT TDD is not the same as the resource mapping in the radio frames for NB-IoT FDD), and thereby exit the cell search as early as possible. In addition, the resource mapping of the other two signal/system information block NPBCH and SIB1-NB in the radio frames for NB-IoT FDD may be the same as the resource mapping in the radio frames for NB-IoT FDD (i.e., they are respectively mapped into the subframes 0 and 4), or may be exchanged.

Figure 4:
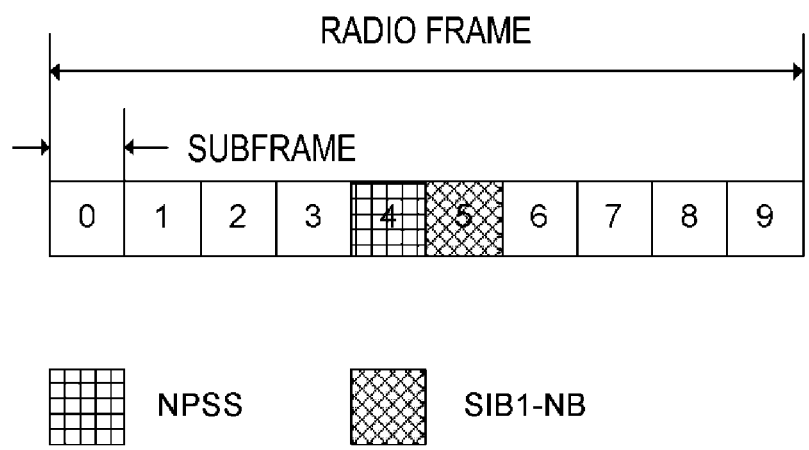
FIG. 4 is a schematic diagram of a resource mapping scheme according to a third embodiment.

In a third embodiment, as shown in FIG. 4, in the radio frames for NB-IoT TDD, the NPSS and the SIB1-NB may be respectively mapped into the subframes 4 and 5. Specifically, the sequence of the NPSS is mapped into subframe 4 of each radio frame, and the SIB1-NB is transmitted in subframes 5 of every other radio frame in 16 consecutive radio frames. In this case, user equipment not supporting NB-IoT TDD will encounter an error during detection of the NPSS and the NSSS when performing a cell search (because the resource mapping of the NPSS and the NSSS in the radio frames for NB-IoT TDD is not the same as the resource mapping in the radio frames for NB-IoT FDD), and thereby exit the cell search as early as possible. In addition, the resource mapping of the other two signal/channel NSSS and NPBCH in the radio frames for NB-IoT TDD may be the same as the resource mapping in the radio frames for NB-IoT FDD (i.e., they are respectively mapped into the subframes 9 and 0), or may be exchanged.

Figure 5:
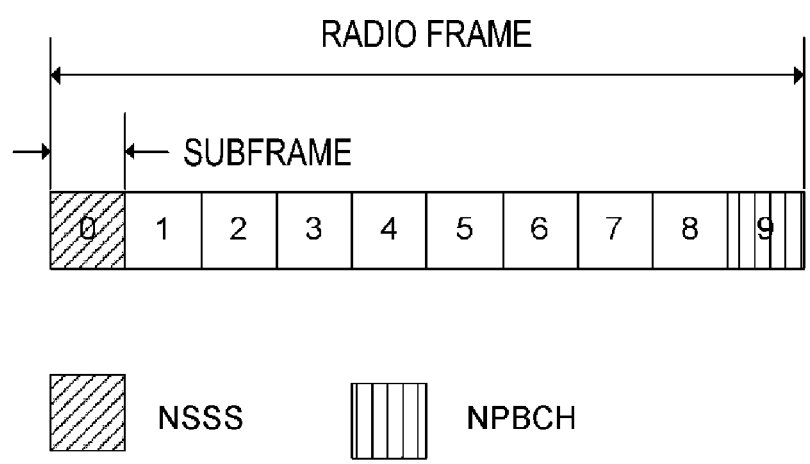
FIG. 5 is a schematic diagram of a resource mapping scheme according to a fourth embodiment.

In a fourth embodiment, as shown in FIG. 5, in the radio frames for NB-IoT TDD, the NPSS and the NPBCH may be respectively mapped into the subframes 0 and 9. Specifically, the sequence of the NSSS is mapped into subframes 0 of even-numbered radio frames, and complex-valued symbols on the NPBCH are transmitted in subframes 9 in 64 consecutive radio frames. In this embodiment, the resource mapping of the NSSS and the NPBCH in the radio frames for NB-IoT TDD is exchanged compared to the resource mapping in the radio frames for NB-IoT FDD. In this case, user equipment not supporting NB-IoT TDD will encounter an error during detection of the NPSS and the NSSS when performing a cell search (because the resource mapping of the NPSS and the NSSS in the radio frames for NB-IoT TDD is not the same as the resource mapping in the radio frames for NB-IoT FDD), and thereby exit the cell search as early as possible. In addition, the resource mapping of the other two signal/system information block NPSS and SIB1-NB in the radio frames for NB-IoT TDD may be the same as the resource mapping in the radio frames for NB-IoT FDD (i.e., they are respectively mapped into the subframes 5 and 4), or may be exchanged.

Figure 6:
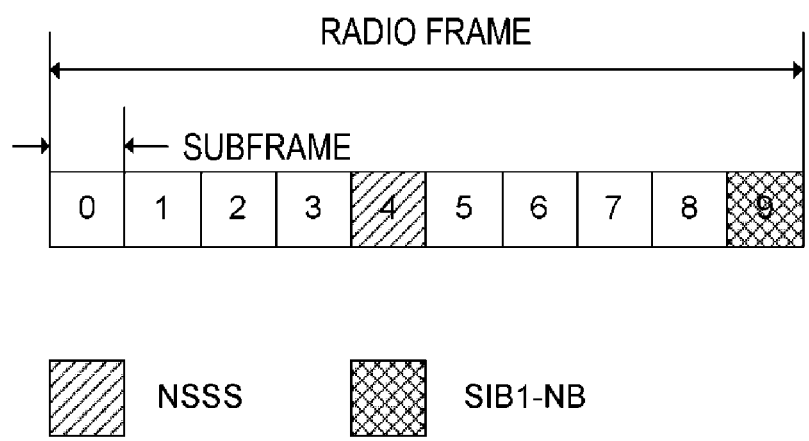
FIG. 6 is a schematic diagram of a resource mapping scheme according to a fifth embodiment.

In a fifth embodiment, as shown in FIG. 6, in the radio frames for NB-IoT TDD, the NSSS and the SIB1-NB may be respectively mapped into the subframes 4 and 9. Specifically, the sequence of the NSSS is mapped into subframes 4 of even-numbered radio frames, and the SIB1-NB is transmitted in subframes 9 of every other radio frame in 16 consecutive radio frames. In this embodiment, the resource mapping of the NSSS and the SIB1-NB in the radio frames for NB-IoT TDD is exchanged compared to the resource mapping in the radio frames for NB-IoT FDD. In this case, user equipment not supporting NB-IoT TDD will encounter an error during detection of the NPSS and the NSSS when performing a cell search (because the resource mapping of the NPSS and the NSSS in the radio frames for NB-IoT TDD is not the same as the resource mapping in the radio frames for NB-IoT FDD), and thereby exit the cell search as early as possible. In addition, the resource mapping of the other two signal/channel NPSS and NPBCH in the radio frames for NB-IoT TDD may be the same as the resource mapping in the radio frames for NB-IoT FDD (i.e., they are respectively mapped into the subframes 5 and 0), or may be exchanged.

Figure 7:
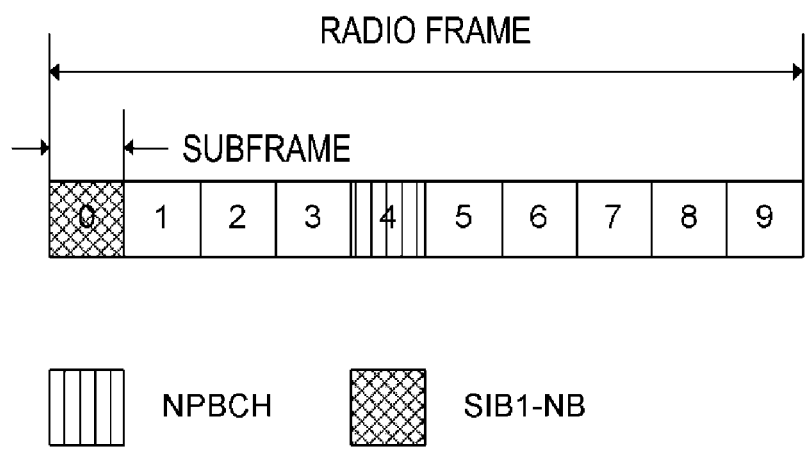
FIG. 7 is a schematic diagram of a resource mapping scheme according to a sixth embodiment.

In a sixth embodiment, as shown in FIG. 7, in the radio frames for NB-IoT TDD, the NPBCH and the SIB1-NB may be respectively mapped into the subframes 4 and 0. Specifically, complex-valued symbols on the NPBCH are transmitted in subframes 4 of 64 consecutive radio frames, and the SIB1-NB is transmitted in subframes 0 of every other radio frame in 16 consecutive radio frames. In this embodiment, the resource mapping of the NPBCH and the SIB1-NB in the radio frames for NB-IoT TDD is exchanged compared to the resource mapping in the radio frames for NB-IoT FDD. In this case, user equipment not supporting NB-IoT TDD will encounter an error during reception of an MIB-NB and the SIB1-NB when performing a cell search (because the resource mapping of the NPBCH and the SIB1-NB in the radio frames for NB-IoT TDD is not the same as the resource mapping in the radio frames for NB-IoT FDD), and thereby no longer continue system information reading and exit the cell search. In addition, the resource mapping of the other two signals NPSS and NSSS in the radio frames for NB-IoT TDD may be the same as the resource mapping in the radio frames for NB-IoT FDD (i.e., they are respectively mapped into the subframes 5 and 9), or may be exchanged.

The resource mapping manners according to the embodiments of the present invention will not affect the operation of conventional user equipment not supporting TDD. When performing cell detection, these user equipments not supporting NB-IoT TDD may detect an NPSS, an NSSS, an NPBCH, and/or an SIB1-NB from received radio frames according to the original mapping scheme for FDD, and will encounter a detection error of the NPSS and/or the NSSS or a reception error of an MIB-NB and/or the SIB1-NB soon upon encounter of a TDD cell, thereby exiting cell search and/or system information reading. A detailed description is given below with reference to FIG. 8.

Figure 8:
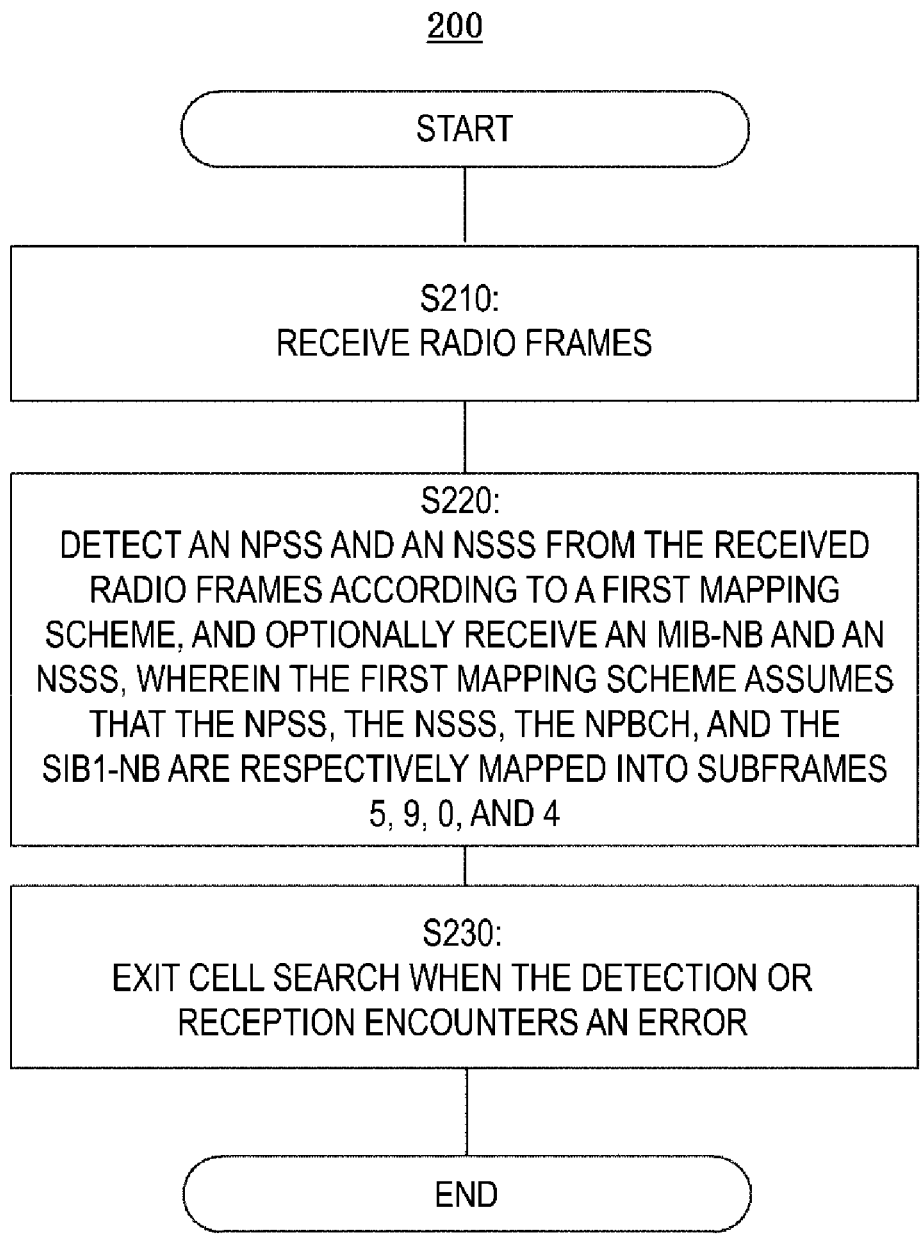
FIG. 8 is a flowchart of a method executed at legacy user equipment not supporting NB-IoT TDD mode.

FIG. 8 is a flowchart of a method 200 executed at conventional user equipment not supporting an NB-IoT TDD mode.

The method 200 starts when the conventional user equipment not supporting NB-IoT TDD mode performs a cell search.

In step S210, the user equipment receives radio signals on a detected cell.

In step S220, the user equipment detects an NPSS and an NSSS from the received radio signals according to a first mapping scheme. Optionally, an MIB-NB carried by an NPBCH and an SIB1-NB may further be received from the received radio signals. The first mapping scheme may be, for example, a mapping scheme for an NB-IoT FDD cell, in which it is assumed that an NPSS, an NSSS, an NPBCH, and an SIB1-NB are respectively mapped into subframes 5, 9, 0, and 4.

In step S230, when the detection error or reception in step S220 encounters an error, it is determined that the detected cell is not supported.

When the detected cell is an NB-IoT TDD cell and one of the first five mapping schemes in the foregoing embodiments is adopted, since the mapping scheme of the NPSS, the NSSS, the NPBCH, and the SIB1-NB used for detection (i.e., the mapping scheme for an NB-IoT FDD cell) does not match, the detection of the NPSS and the NSSS in step S220 will encounter an error. Then, in step S230, it can be determined that the user equipment does not support the cell corresponding to the received radio frames (i.e., the detected cell). Therefore, the cell search and/or system information reading can be exited as early as possible, thereby saving power consumption of the user equipment and reducing system access latency.

In an embodiment where the detected cell is an NB-IoT TDD cell and the mapping scheme of the foregoing sixth embodiment is adopted, step S220 may further include receiving, from the received radio signals, the MIB-NB carried by the NPBCH and the SIB1-NB. The NPSS and the NSSS may be routinely detected in step S220, but since the mapping scheme of the NPSS, NSSS, NPBCH, and SIB1-NB used for the detection (i.e., the mapping scheme for an NB-IoT FDD cell) does not match, the reception of the MIB-NB and the SIB1-NB will encounter error. Then, in step S230, it can be determined that the user equipment does not support the cell corresponding to the received radio frames (i.e., the detected cell). Therefore, the cell search and/or system information reading can be exited as early as possible, thereby saving power consumption of the user equipment and reducing system access latency.

Figure 9:
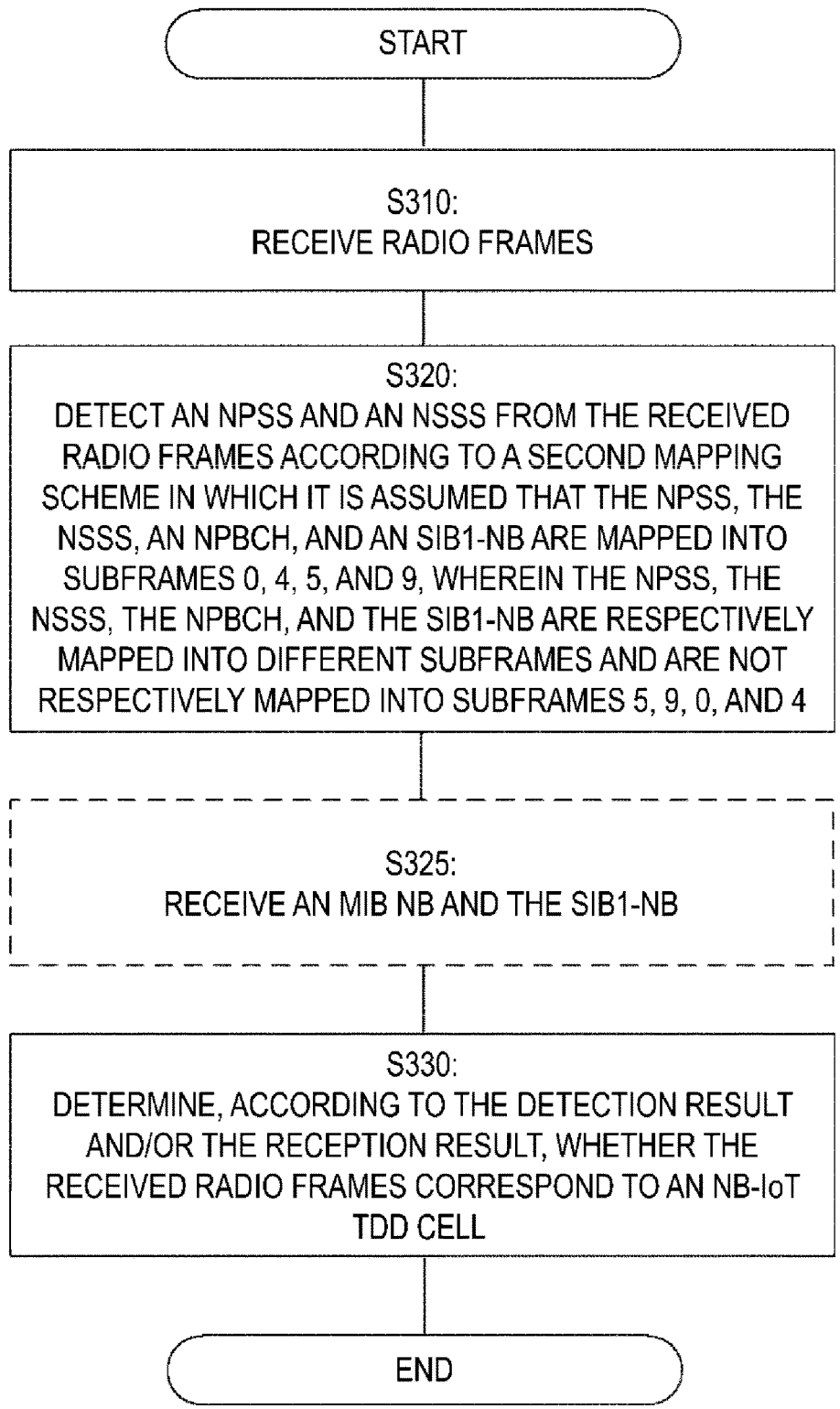
FIG. 9 is a flowchart of a method executed at user equipment supporting NB-IoT TDD mode according to an embodiment of the present disclosure.

FIG. 9 is a flowchart of a method 300 executed at user equipment supporting an NB-IoT TDD mode according to an embodiment of the present disclosure.

The method 300 starts when the user equipment performs a cell search.

In step S310, radio signals on the detected cell are received.

In step S320, an NPSS and an NSSS are detected from the received radio signals according to a second mapping scheme. The second mapping scheme is a resource mapping scheme provided by the present invention for an NB-IoT TDD cell. It is assumed in the second mapping scheme that the NPSS, the NSSS, an NPBCH, and an SIB1-NB are mapped into subframes selected from subframes 0, 4, 5, and 9 in the radio frames, and the NPSS, the NSSS, the NPBCH, and the SIB1-NB are respectively mapped into different subframes and are not respectively mapped into the subframes 5, 9, 0, and 4. For example, the second mapping scheme may adopt any one of the mapping schemes described in the foregoing exemplary embodiments 1-6. That is, the second mapping scheme may adopt one of the following mappings: mapping the NPSS, the NSSS, the NPBCH, and the SIB1-NB into the subframes 0, 9, 5, and 4, respectively; mapping the NPSS, the NSSS, the NPBCH, and the SIB1-NB into the subframes 9, 5, 0, and 4, respectively; mapping the NPSS, the NSSS, the NPBCH, and the SIB1-NB into the subframes 4, 9, 0, and 5, respectively; mapping the NPSS, the NSSS, the NPBCH, and the SIB1-NB into the subframes 5, 0, 9, and 4, respectively; mapping the NPSS, the NSSS, the NPBCH, and the SIB1-NB into the subframes 5, 4, 0, and 9, respectively; and mapping the NPSS, the NSSS, the NPBCH, and the SIB1-NB into the subframes 5, 9, 4, and 0, respectively.

If the NB-IoT TDD cell adopts one of the first five mapping schemes, in step S320, and if the detection is successful, the process proceeds to step S330, and it is determined that the cell corresponding to the received radio frames is an NB-IoT TDD cell.

If the NB-IoT TDD cell adopts the foregoing sixth mapping scheme, in step S320, if the detection of the NPSS and the NSSS is successful, the process proceeds to an optional step S325 to continue to receive a MIB-NB and an SIB1-NB from the received radio frames. If the reception of the MIB-NB and the SIB1-NB is also successful, the process proceeds to step S330, and it is determined that the cell corresponding to the received radio frames is an NB-IoT TDD cell.

In the method 300, if the detection in step S320 encounters an error or the reception in step S325 encounters an error, it can be determined that the cell corresponding to the received radio signals (i.e., the detected cell) is not an NB-IoT TDD cell. Then, another mapping manner (for example, a mapping manner for an NB-IoT FDD cell) may be used for detection, or the cell search may be exited.

Figure 10:
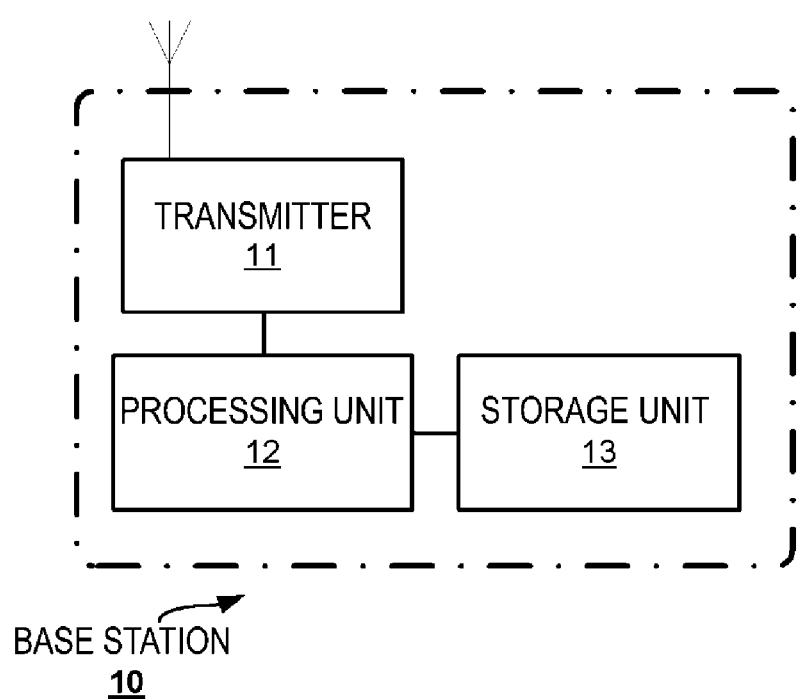
FIG. 10 is a block diagram of a base station supporting NB-IoT TDD mode according to an embodiment of the present disclosure.

FIG. 10 is a block diagram of a base station 10 supporting an NB-IoT TDD mode according to an embodiment of the present disclosure. The base station 10 can be used for executing the method described with reference to FIG. 1.

As shown in FIG. 10, the base station 10 includes a transceiver 11 for external communication, which may include a separate transmitter and receiver, or may include a transceiver integrated with a transceiving function; a processing unit or processor 12, which may be a single unit or a combination of a plurality of units for performing the different steps of the method 100; a storage unit or memory 13, which stores computer executable instructions that, when executed by the processing unit 12, cause the base station 10 to perform operations corresponding to the method 100, such as generating radio frames for NB-IoT TDD, and transmitting the generated radio frames via the transmitter.

Figure 11:
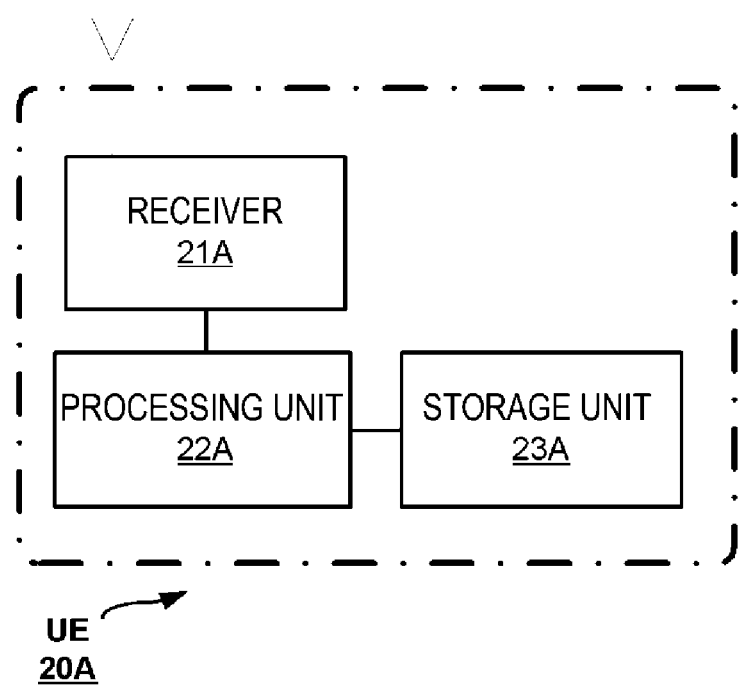
FIG. 11 is a block diagram of user equipment not supporting NB-IoT TDD mode.

FIG. 11 is a block diagram of user equipment 20A not supporting an NB-IoT TDD mode. As shown FIG. 11, the user equipment 20A includes a transceiver 21A for external communication, which may include a separate transmitter and receiver, or may include a transceiver integrated with a transceiving function; a processing unit or processor 22A, which may be a single unit or a combination of a plurality of units for performing the different steps of the method 200; a storage unit or memory 23A, which stores computer executable instructions that, when executed by the processing unit 22A, cause the user equipment 20A to perform operations corresponding to the method 200, such as receiving radio signals, detecting an NPSS and an NSSS from the received radio signals according to a first mapping scheme (such as a mapping scheme for an NB-IoT FDD cell), and exiting the cell search according to an error in the detection result.

Figure 12:
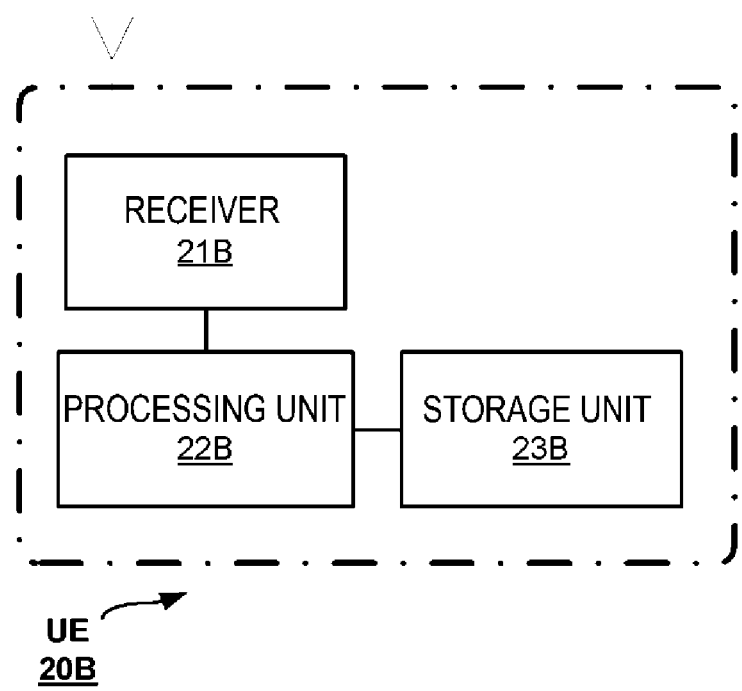
FIG. 12 is a block diagram of user equipment supporting NB-IoT TDD mode according to an embodiment of the present disclosure.

FIG. 12 is a block diagram of user equipment 20B supporting an NB-IoT TDD mode. As shown in FIG. 12, the user equipment 20B includes a transceiver 21B for external communication, which may include a separate transmitter and receiver, or may include a transceiver integrated with a transceiving function; a processing unit or processor 22B, which may be a single unit or a combination of a plurality of units for performing the different steps of the method 300; a storage unit or memory 23B, which stores computer executable instructions that, when executed by the processing unit 22B, cause the user equipment 20B to perform operations corresponding to the method 300, such as receiving radio signals, detecting an NPSS and an NSSS from the received radio signals according to a second mapping scheme (such as a mapping scheme for an NB-IoT TDD cell), and/or receiving an MIB-NB carried by an NPBCH and an SIB1-NB, and determining whether a cell corresponding to the received radio frames is an NB-IoT TDD cell.

The base station 10 and the user equipment 22A and 22B may be used for executing the method 100, 200, or 300 described above. For specific operations thereof, reference may be made to the above description about the method 100, 200, or 300, which will not be elaborated again.

Those skilled in the art should understand that only components related to the present disclosure are shown in the base station and/or user equipment in FIGS. 10-12 to avoid confusion of the present disclosure. However, those skilled in the art should understand that although not shown in the figures, the base station and/or user equipment according to the embodiments of the present disclosure may further include other basic units that make up the base station and/or user equipment.

The present disclosure further provides at least one computer storage medium in the form of a non-volatile or volatile memory, such as an electrically erasable programmable read-only memory (EEPROM), a flash memory, and a hard disk drive. Computer executable instructions, when executed by the processing unit 12, cause the base station 10 to perform, for example, the actions of the process 100 described previously with reference to FIG. 1, or when executed by the processing unit 22B, cause the user equipment 22B to perform, for example, the actions of the process 300 described previously with reference to FIG. 9.

The processor may be a single CPU (central processing unit), but may also include two or more processors. For example, the processor may include a general-purpose microprocessor, an instruction set processor and/or a related chip set and/or special microprocessor (for example, an application specific integrated circuit (ASIC)). The processor may also include an on-board memory for caching purposes. For example, the computer storage medium may be a flash memory, a random access memory (RAM), a read-only memory (ROM), or an EEPROM.

The program running on the device according to the present disclosure may be a program that enables a computer to implement the functions of the embodiments of the present disclosure by controlling a central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing them by the computer system. The so-called "computer system" may be a computer stem embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-piece integrated circuits). Circuits designed to execute the functions described in the present specification may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method performed by a user equipment comprising, in Time Division Duplex (TDD):
    receiving a block of complex-valued symbols for narrowband physical broadcast channel (NPBCH) in subframe 9 during 64 consecutive radio frames;
    receiving a narrowband primary synchronization signal (NPSS); and
    receiving a narrowband secondary synchronization signal (NSSS), wherein
    the NPSS is mapped to resource elements in subframe 5 in every radio frame; and
    the NSSS is mapped to resource elements in subframe 0 in even radio frames, wherein
    the resource mapping of the NSSS and the NPBCH in the radio frames is exchanged compared to resource mapping of a NSSS and a NPBCH in the radio frames for Frequency Division Duplex (FDD), and
    in FDD, the NSSS is mapped to resource elements in subframe 9 in even radio frames, and the NPBCH is mapped to subframe 0 during 64 consecutive radio frames.

2. A method performed by a base station comprising, in Time Division Duplex (TDD):
    generating radio frames;
    transmitting a block of complex-valued symbols for narrowband physical broadcast channel (NPBCH) in subframe 9 during 64 consecutive radio frames;
    mapping a narrowband primary synchronization signal (NPSS) to resource elements in subframe 5 in every radio frame;
    mapping a narrowband secondary synchronization signal (NSSS) to resource elements in subframe 0 in even radio frames,
    transmitting the NPSS; and
    transmitting the NSSS, wherein
    the resource mapping of the NSSS and the NPBCH in the radio frames is exchanged compared to resource mapping of a NSSS and a NPBCH in the radio frames for Frequency Division Duplex (FDD), and
    in FDD, the NSSS is mapped to resource elements in subframe 9 in even radio.

3. A user equipment (UE) comprising, in Time Division Duplex (TDD):
    receiver configured to
        receive a block of complex-valued symbols for narrowband physical broadcast channel (NPBCH) in subframe 9 during 64 consecutive radio frames;
        receive a narrowband primary synchronization signal (NPSS); and
        receive a narrowband secondary synchronization signal (NSSS), wherein
    the NPSS is mapped to resource elements in subframe 5 in every radio frame; and
    the NSSS is mapped to resource elements in subframe 0 in even radio frames, wherein
    the resource mapping of the NSSS and the NPBCH in the radio frames is exchanged compared to resource mapping of a NSSS and a NPBCH in the radio frames for Frequency Division Duplex (FDD), and
    in FDD, the NSSS is mapped to resource elements in subframe 9 in even radio frames, and the NPBCH is mapped to subframe 0 during 64 consecutive radio frames.

4. A base station comprising, in Time Division Duplex (TDD):
    processor configured to generate radio frames; and
    transmitter configured to
        transmit a block of complex-valued symbols for narrowband physical broadcast channel (NPBCH) in subframe 9 during 64 consecutive radio frames;
        map a narrowband primary synchronization signal (NPSS) to resource elements in subframe 5 in every radio frame; and;
        map a narrowband secondary synchronization signal (NSSS) to resource elements in subframe 0 in even radio frames,
        transmit the NPSS; and
        transmit the NSSS, wherein
    the resource mapping of the NSSS and the NPBCH in the radio frames is exchanged compared to resource mapping of a NSSS and a NPBCH in the radio frames for Frequency Division Duplex (FDD), and
    in FDD, the NSSS is mapped to resource elements in subframe 9 in even radio frames, and the NPBCH is mapped to subframe 0 during 64 consecutive radio frames.

* * * * *